Figure 1:
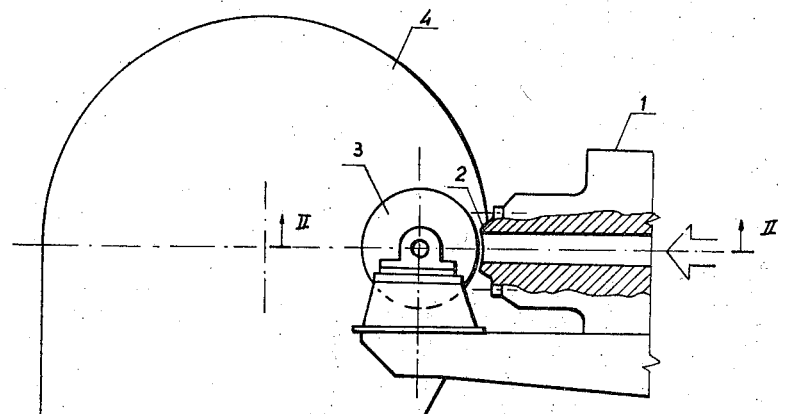

United States Patent

[11] 3,550,867

| [72] | Inventors | Mario Ballestra<br>Corso Buenos Aires 92;<br>Domenico Triberti, Via Burlamacchi 11,<br>Milan, Italy |
|---|---|---|
| [21] | Appl. No. | 688,403 |
| [22] | Filed | Dec. 6, 1967 |
| [45] | Patented | Dec. 29, 1970 |
| [32] | Priority | Dec. 10, 1966 |
| [33] | | Italy |
| [31] | | No. 779813 |

[54] FRAGMENTING AND DRYING METHOD
4 Claims, 2 Drawing Figs.

[52] U.S. Cl. .................................. 241/3,
241/18
[51] Int. Cl. ................................ B02c 18/22,
B02c 19/12; B01j 2/20
[50] Field of Search .......................... 241/3, 18,
27, 30, 60, 73(Cursory), 277(Cursory); 264/5, 8, 13, 14;
18/12A, 12DR, 12TS, 12TT; 146/121(Cursory)

[56] References Cited
UNITED STATES PATENTS

| 357,317 | 2/1887 | Hascall | 241/73X |
|---|---|---|---|
| 729,239 | 5/1903 | Swart | 146/121 |
| 3,025,564 | 3/1962 | Voigt | 264/13X |
| 3,066,878 | 12/1962 | Wildbolz | 241/277 |
| 3,324,510 | 6/1967 | Kleeb | 18/12(A) |
| 3,350,482 | 10/1967 | Bowers | 264/13 |

Primary Examiner—Robert C. Riordon
Assistant Examiner—Donald G. Kelly
Attorney—Robert E. Burns ABSTRACT: A method for fragmenting a material, for example soap, in an extruded state, by continuously detaching, successively substantially uniform chips, portions or small masses from a section of the extruded material constituting a leading section of a rod or bar of the material continuously advanced longitudinally. The detached portions are detached from the bar of material in a plastic state by ganged cutters comprising a plurality of rotationally driven coaxial cutter discs each having peripheral teeth and each inclined less than 20° relative to a plane normal to the axis of rotation of the cutters. The portions or small masses detached from the leading end or section of the rod or bar of material, which is continuously advanced longitudinally and fed to the rotary cutters, are projected along a path, in a gaseous medium, within a casing or housing where they tend to give up moisture and are at least partially solidified. The partially solidified sections are subjected to air conveyor means thereby to pelletize the detached portions and further solidify and crystallize the pellets. An example of the material to which the invention is applicable is bar soap.

FRAGMENTING AND DRYING METHOD

The present invention relates generally to granulators and pelletizers and more particularly to a method for drying, crystallizing and cooling by means of evaporation a material which is in a plastic state and is sufficiently solid to be extrudable into a plastic state.

Apparatus for drying and solidifying materials in a plastic state are known. Apparatus for cutting such as granulators, pelletizers and dicers are known. These apparatus generally use knives for fragmenting the material and the solidification, if the material isn't already solidified, takes place in complex and expensive apparatus.

It is a principal object of the present invention to provide a simple, inexpensive method for drying, crystallizing and solidifying, by evaporation and cooling, an extruded material in a plastic or deformable state.

According to the method of the invention extruded material or material which is in a plastic state, for example bar soaps, is converted into solidified portions by fragmenting the extruded material into substantially uniform portions or small masses. A rod or bar of the material in a plastic state is continuously fed into means for removal or detaching of chips or small portions of a section of the bar uniformly, for example on the whole leading end or portion of the bar. The chips or small portions immediately after being detached are projected along a gaseous path in which they release humidity or moisture contained therein and because of the increase of the ratio of surface to volume the removed fragments are dried and/or crystallized partially and are completely solidified or crystallized and pelletized by means of an air stream or air conveyor.

The material to be solidified and crystallized is fragmented by feeding the bar of material in a plastic state, for example extruded material, into a plurality of rotary drive cutters. The cutters comprise a plurality of coaxial, axially spaced discs having peripheral teeth rotating on a common axis of rotation and spaced thereon equal axial distances. The individual rotary discs are inclined relative to a normal or plane normal to the axis of rotation thereof less by an angle of inclination than 20°. The axis of rotation is perpendicular to the direction of outflow of the path of advancement of the rod or bar of material.

The peripheral speed of the discs and the pitch of the teeth thereof as well as the inclination of the discs and their thickness and the speed at which the bar of material is fed into the teeth are selected in such a way as to obtain the desired depth of cut, length and thickness of the individual portions, chips or small masses of material removed from the leading section of the bar of material in a plastic state.

The apparatus is housed in a housing which defines or limits the path of travel or trajectory of the portions of material removed or detached from the rod of material so that the path of the projection thereof is through a gaseous medium, for example air, in which the portions are allowed to travel over a sufficient lengthy path such that they give up moisture and are at least partially dried and solidified. The small detached masses or portions exit out of a housing or hopper outlet where they are subjected to an air stream or air conveyor means which further carries out solidificaton and drying and/or crystallization of the portions of material. The material upon leaving the preliminary path of travel for entry into the air conveyor is sufficiently in a deformable state that is is pelletized and is crystallized and/or granulated in the air conveyor.

Figure 2:
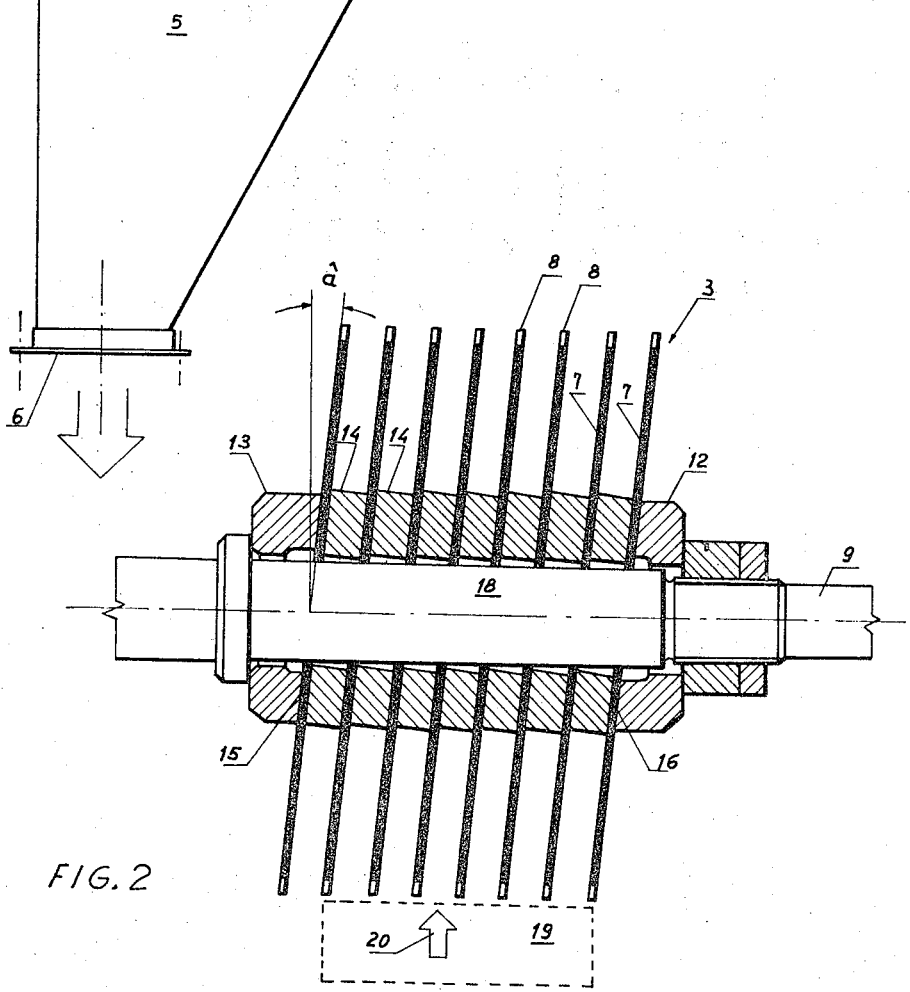

Other features and advantages of the method in accordance with the present invention will be better understood as described in the following specification and appended claims, in conjunction with the following drawings, in which:

FIG. 1, is a diagrammatic elevation view partly in section of apparatus for carrying out the method according to the invention; and FIG. 2 is a section view, on an enlarged scale, taken along section line 2-2 of FIG. 1.

As illustrated in FIG. 1 a mixer or extruder 1, of a material, for example bar synthetic soaps, to be fragmented in accordance with the invention, is illustrated fragmentarily. The extruded material is delivered therefrom through an outlet or nozzle 2 in a plastic condition or state as in a rod having a suitable cross section for example a prism or cylindrical cross section.

When the material leaves the outlet 2 in a plastic state it is continuously fed to a rotary cutter apparatus 3 which continuously removes or detaches, uniformly across the leading edge or end of the rod of extruded material, chips or portions of substantially uniform size from the material and projects them successively as individual particles along a trajectory circumscribed by a housing or cowling 4 and into a hopper 5 tapering to an outlet or exit 6 where the detached portions, which are at least partially dried and solidified are discharged from the apparatus and are successively collected by an air conveyor, not shown, in which the drying and/or crystallization is completed. The partially dried portions of material in the air stream of the air conveyor because of their mutual friction or contact have their edges rounded so that the chips assume a rounded form or are pelletized and the crystallization or granulation thereof is completed.

The cutter means 3 is illustrated in FIG. 2, which is a view taken in a plane normal to the plane of the sheet of the drawings, and comprises a plurality of cutter discs 7 each provided along the periphery thereof with saw teeth 8. The cutter discs are mounted coaxially on a common axis of rotation defined by a rotary driven shaft 9 which can be driven rotationally at variable speeds by a motor, not shown. The cutter discs 7 are mounted on the shaft 9 by bushings 12, 13 bearing against a collar as shown and locked in position by nuts on a threaded portion of the shaft 9. The blades are axially spaced equal axial distances by rings or spacers 14 disposed between each two adjacent discs. The bushings 12, 13 have inclined inner faces 15, 16 at a desired inclination of the toothed discs 7 so that the discs are inclined relative to a normal or plane normal to the common axis of rotation as hereinafter explained.

An intermediate axial length 18 of the shaft 9 has a diameter less than a central opening of each of the toothed discs 7 and the spacing rings 14 so that these may assume the desired angle of inclination with respect to the axis of the shaft 9. In the embodiment illustrated the necessary centering and inclination between the shaft 9 and the elements 7, 14 is obtained by selecting the diameter of the central hole of the discs 7 and the rings 14 equal to $d/\cos a$, where $d$ is the diameter of the shaft 9 and $a$ is the inclination angle of the discs and of the faces 15 and 16 of the bushings 12, 13. The angle of inclination is less than 20° and is preferably between 5° and 10° Because of the inclination the discs 7 the teeth 8 thereof remove uniformly chips or portions of a bar of material 19 constantly being fed axially or longitudinally from the outlet 2. The removal or detachment of the portions of the plastic material is uniformly across the whole width of the leading section of the bar coming from the nozzle or outlet 2.

As shown in FIG. 2 a forward or leading end of the bar of material 19, which can have a cylindrical or prism cross section, advancing in the direction of the rotating discs 7, as illustrated by the arrow 20, and because of the angle of inclination of the discs 7 the distance of the end of the teeth 8 from the axis of rotation varies between a minimum and maximum twice during each rotation or turn of the individual discs, has an end thereof uniformly acted upon. Consequently the portions or chips removed by the teeth 8 are uniform and have a thickness which increases and then decreases from one end to the other. The formation of the detached portions is such that they have substantially the same size while any pulverulent particles formed can be recovered by means of cyclone recovery devices, not shown, and then recycled into the mixer or feeding apparatus 1 which may be a mixer or extruder. Moreover these small powder particles are limited to a minimum.

The axial distance between any two discs is measured parallel to the axis or of rotation and must be less than $D (\sin a)/2$ where D is the outside diameter of the discs 7. With this relationship the peripheral speed of the discs 7 must be selected a as a function of the pitch and depth of the teeth 8 as well as the rate of speed of the bar of material 19. By varying one or the other of the speeds it is possible to vary within sufficiently wide limits the size of the chips or portions of the material 19 removed by each tooth without having to replace or change any part of the apparatus or set of discs 7 in the device 3.

The method of drying and crystallizing and solidifying a plastic material according to the invention is particularly applicable to treatment of bar synthetic soaps having as a principal component tripolyphosphate of an alkaline metal. The materials should be at a temperature upon extrusion in the order of about 30 to 85° centigrade. For example a preferred material is sodiumtripolyphosphate at a preferred temperature of about 30 to 45° centigrade.

The air in which the solidification takes place may range from 5 to 100° centigrade. It has been found that the peripheral speed of rotation of the discs 7 can range from 4 to 20 meters per second and teeth 8 may be in the order of 3 to 15 millimeters in size.

Those skilled in the art will recognize that the result according to the invention is generally accomplished without need of complex expensive drying equipment hitherto used to obtain the same object. Moreover, it will be understood that heated and cooling air may be used in the apparatus and in the air conveyor thereof. Furthermore, the air conveyor can transport the solidified chips or small masses to any desired location, for example to storage or otherwise to another location.

While a preferred embodiment of the apparatus for carrying out the new and improved inventive method has been shown and described it will be understood that many modifications and changes can be made within the true spirit and scope of the invention.

We claim:

1. A method of for fragmenting and drying a material in a plastic state comprising, continuously advancing a rod of material to be dried in a plastic state, continuously detaching individually and simultaneously a multiplicity of portions of said material from a leading portion of said rod of material as said material is advancing, immediately upon detaching the individual portions of said material projecting them along a path for removing therefrom humidity for drying said portions and at least partially solidifying said portions.

2. A method according to claim 1, including after projecting said portions subjecting them to an air stream pelletizing the partially solidified portions.

3. A method for fragmenting and drying a material in a plastic state comprising continuously advancing a rod of material in a plastic state and to be dried, progressively detaching individually and simultaneously a multiplicity of individual portions of said material from a leading portion of the same rod of material while said rod is advancing longitudinally, immediately upon completion of the progressive detachment of each individual portion projecting the individual portions along a path and removing therefrom while travelling along said path humidity to dry said portions and at least partially solidifying said portions, and while progressively detaching the first mentioned multiplicity of individual portions progressively detaching, simultaneously and individually another multiplicity of individual portions of said material from a leading portion of said same rod of material, immediately after detachment of said another multiplicity of individual portions projecting the detached portions individually along a path for removing therefrom humidity to at least partially solidifying the second multiplicity of detached portions, and successively repeating the detachment of other individual portions simultaneously while advancing said same bar and the immediate projection of said other portions along individual paths to at least partially solidify said portions.

4. A method according to claim 3, including after projecting said portions subjecting them to an air stream pelletizing the partially solidified portions.